United States Patent [19]

Marvy

[11] 4,165,776
[45] Aug. 28, 1979

[54] VEHICLE WHEELS

[75] Inventor: Jean-Francois Marvy, Montlucon, France

[73] Assignee: Dunlop Limited, Great Britain

[21] Appl. No.: 804,261

[22] Filed: Jun. 7, 1977

Related U.S. Application Data

[63] Continuation of Ser. No. 576,369, May 12, 1975, abandoned.

[30] Foreign Application Priority Data

May 20, 1974 [FR] France ............................... 74 17423

[51] Int. Cl.² ............................................. B60C 5/12
[52] U.S. Cl. ............................................... 152/381.1
[58] Field of Search ................................. 301/95–99;
152/366, 375, 378 R, 379.1, 379.2, 381.1, 381.2,
396, 399–401, 395, 381.2 WF, 381.2 F, 381 WC

[56] References Cited

U.S. PATENT DOCUMENTS

| 597,313 | 1/1898 | Carmont | 152/395 |
|---|---|---|---|
| 638,996 | 12/1899 | Stock | 152/379.1 |
| 658,093 | 9/1900 | McCaslin | 301/98 |
| 1,032,125 | 7/1912 | Dorsey | 152/366 |
| 2,128,322 | 8/1938 | Riehl | 152/381.6 |
| 2,840,133 | 6/1958 | Billingsley | 152/381.2 |

FOREIGN PATENT DOCUMENTS 856886 8/1940 France ........................................ 301/97
2183094 12/1973 France .

Primary Examiner—Robert J. Spar
Assistant Examiner—H. Grant Skaggs
Attorney, Agent, or Firm—Stevens, Davis, Miller & Mosher

[57] ABSTRACT

A wheel rim assembly comprising a well disposed between seating portions for the beads of an associated pneumatic tire and a ring of flexible material arranged to fill the well, the well having a profile which retains the ring in position within the well.

1 Claim, 5 Drawing Figures

VEHICLE WHEELS

This is a continuation of now abandoned application Ser. No. 576,369 filed May 12, 1975.

The present invention relates to improvements in or relating to pneumatic tire and rim assemblies, and particularly to rims of the well-base type.

It is known that the main disadvantage of such wheels consists in the fact that, when the pneumatic tire goes flat, more especially in the case of a pneumatic tire without an inner tube, its beads fall into the hollow of the rim and the pneumatic tire comes off the wheel which can cause serious accidents.

It has already been proposed to remedy this disadvantage, but the devices used to this end do not allow the pneumatic tire to be removed or impose a rim of complex structure and not very practical.

The aim of the present invention is to provide wheels of the aforesaid type in such a way that wheels of conventional type can be used without modifying them, the fitting-on and the removal of the pneumatic tire remaining simple and capable of being effected by means of known machines.

According to one aspect of the invention a wheel rim assembly comprises a well disposed between seating portions for the beads of an associated pneumatic tire and a ring of flexible material arranged to fill the well, the well having a profile which retains the ring in position within the well.

The ring is preferably continuous and of an elastic material and may be associated with a retaining element.

According to a further aspect of the invention a well rim comprises a well disposed between seating portions for the beads of an associated pneumatic tire, the well having at least one wall dished so that in cross-section the radially outer portion thereof overhangs the well. At least one wall of the well is dished to provide an undercut in said wall and both walls of the well may be dished to give the well a dove-tailed profile.

According to a still further aspect of the invention a ring of flexible material for use to fill the well of an associated wheel rim comprises an annulus having a cross-section which is greater at the inner diameter than at the outer diameter.

The invention also includes a tire and rim assembly comprising a rim of the above kind with a pneumatic tire mounted thereon.

The description which will follow with regard to the attached drawings will better show by example only how the invention can be carried out.

Figure 1:
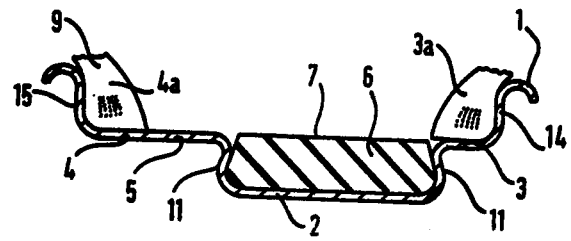
FIG. 1 is a diagrammatic view in radial section of a first embodiment of a tire and rim assembly in accordance with the invention.

FIG. 1 illustrates a first embodiment of the invention in which a wheel rim 1 comprises two bead retaining flanges 14 and 15, seating portions or regions 3 and 4 for the beads 3a and 4a of an associated pneumatic tire and a well 2 disposed between the bead seating portions.

The well 2 is not positioned in the middle of the rim but offset adjacent the bead seat 3, the other bead seat 4 merges into a cylindrical ledge 5, the axially inner edge of which merges into a wall 11 of the well 2.

The well 2 is arranged to be filled by a safety ring 6 made of flexible and extensible material, for example a rubber or a similar elastomer. The ring 6 is arranged to fit in the well so that the radially outer face 7 of the ring is substantially level with the cylindrical ledge 5 on one side of the rim and the bead seat 3 on the opposite side of the rim.

The ring 6 can be continuous and is held within the well 2 for example by preliminary tension, the ring normally having a smaller diameter than the base of the rim. The degree of tension is generally limited in such a way that the ring when placed in position within the well is stretched from about 5 to 20%, so as not to make the fitting-on too difficult, and to reduce the possibility of relaxation of the material of the ring when the assembly is in use. The ring may be glued to the rim, in which case the preliminary tension may be reduced or even eliminated altogether.

The walls 11 of the well are dished to provide an overhang or circumferential projection at the radially outer edges thereof, the dishing of the walls providing an undercut which gives the well a dove-tailed profile. As shown in FIG. 1 the dove-tailed profile of the well 2 is provided with rounded angles, the converging walls acting to exert a retaining effect on the ring 6. The ring 6 may be provided with straight sides which distort to assume the profile of the well or may be provided with sides correspondingly shaped to fit within the dished surface of the walls of the well.

Figure 2:
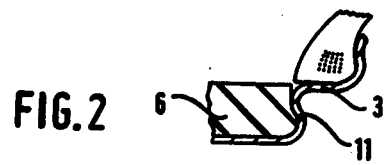
FIG. 2 is a partial section of a variant of embodiment of a safety ring intended to be combined with the rim of FiG. 1.

In FIG. 1, the sides of the ring are of frusto-conical form while in an alternative construction shown in FIG. 2 the sides of the ring assume a substantially cylindrical form.

Figure 3:
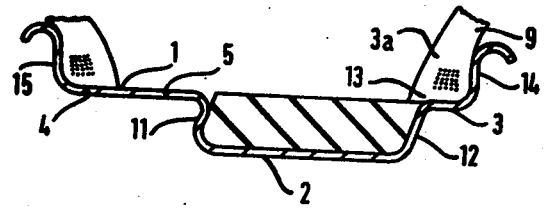
FIG. 3 is a view similar to FIG. 1, showing a second example of a tire and rim assembly.

In a second embodiment shown in FIG. 3, a wall 12 of the well 2 adjacent the bead seat 3 is provided with an inclined surface which extends axially outwardly as it merges with the bead seat. Both walls 11 and 12 are substantially parallel and incline towards the bead seat 3. It can be seen from FIG. 3 that the toe 13 of the associated bead 3a overhangs the bead seating portion 3 and extends into the well 2. When the ring 6 is located in the well the toe 13 of the bead 3a engages the radially outer surface 7 of the ring 6 and assists in locating the ring within the well. The other side of the ring 6 is located within the well by the undercut formed in the dished wall 11 of the well.

Figure 4:
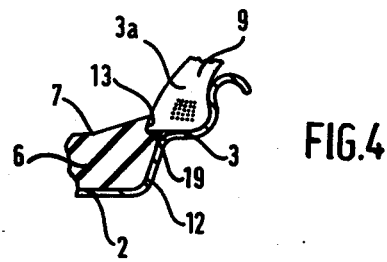
FIG. 4 is a partial section illustrating variants of the embodiment of the safety ring shown in FIG. 3.

In an alternative construction shown in FIG. 4 the radially outer face of the ring 6 adjacent the bead 3a is provided with a groove 19 into which the toe 13 of the associated bead is arranged to locate thereby serving to prevent the bead 3a from being displaced from its associated bead seat 3.

Figure 5:
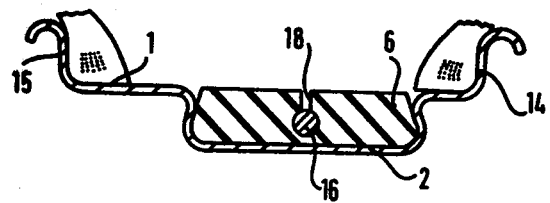
FIG. 5 is a sectional view of a rim assembly forming a third embodiment of the invention.

FIG. 5 shows a third embodiment of the invention in which the rubber ring 6 is provided with a split sprung circlip 16 which is located in a deep groove 18 having an enlarged base formed in the center of the ring 6. The circlip 16 serves to additionally locate the ring within the well and prevents displacement of the ring from the well due to the centrifugal force produced when the assembly is rotated at speed.

At normal vehicle speeds good results are obtained by forming the ring in an elastomer having a modulus of 10 to 25 Kg/cm² at 20% extension and of 50 to 100 Kg/cm² at 100% extension, the hardness being from 60 to 90 Shore A.

The invention can be applied to wheel rims having a well and especially to rims intended to be provided with tubeless tires as well as so-called semi-dropped center rims that is to say rims comprising a well of reduced depth and a detachable rim flange. These rims are generally intended for wheels of light trucks or heavy vehicles.

The location of the flexible ring within the well of the rim prevents the beads of the associated tire from being displaced from their bead seats into the well when the tire and rim assembly is used in a deflated condition, thereby improving the handling characteristics of the vehicle in the event of a blow-out or puncture.

Having now described my invention—what I claim is:

1. The assembly of a one-piece, sheet metal wheel rim for a pneumatic tire, the rim having a well to accept an inextensible bead at the inner periphery of one sidewall of the tire to facilitate mounting and dismounting a tire relative to the rim, and a flexible well-filler, the rim comprising axially spaced-apart bead seating regions, a radially inwardly depressed tire mounting well between the bead seating regions, and a cylindrical ledge adjacent one of the bead seating regions and between it and the well, the well being defined by two circumferential walls separated by a bottom, and the well-filler being an annulus at least mainly of flexible material shaped to fit in and fill the well, at least one of said circumferential walls of the well is formed with a circumferential projection extending into the well axially of the rim and spaced radially of the rim from the well bottom, the well-filler extending beneath the projection between the latter and the well-bottom to tend to resist radially outward displacement of the well-filler from the well, the wall of the well adjacent the cylindrical ledge tapers axially towards the bottom of the well and the wall of the well adjacent the other opposite bead seating region similarly tapers axially towards the bottom of the well so that the axial width of the other bead seating region is less than the axial width of the associated tire bead so when a tire is mounted on the rim the bead assists in holding the ring in the well, and said well filler has a circumferentially extending cut-out therein which is arranged to accommodate the toe of an associated tire bead.

* * * * *